US012805685B2

(12) United States Patent
Teh et al.

(10) Patent No.: US 12,805,685 B2
(45) Date of Patent: Nov. 24, 2026

(54) BATTERY-POWERED SURFACE CLEANING APPARATUS

(71) Applicant: BISSELL Inc., Grand Rapids, MI (US)

(72) Inventors: Yee Siang Teh, Singapore (SG); Gurdev Singh, Singapore (SG); Kim Hui Too, Singapore (SG); Matthew Kamps, Caledonia, MI (US); Eric Jon Stuive, Zeeland, MI (US)

(73) Assignee: BISSELL Inc., Grand Rapids, MI (US)

( * ) Notice: Subject to any disclaimer, the term of this patent is extended or adjusted under 35 U.S.C. 154(b) by 541 days.

(21) Appl. No.: 18/376,027

(22) Filed: Oct. 3, 2023

(65) Prior Publication Data

US 2024/0108188 A1 Apr. 4, 2024

Related U.S. Application Data

(60) Provisional application No. 63/412,715, filed on Oct. 3, 2022.

(51) Int. Cl.
*A47L 11/40* (2006.01)
*A47L 9/28* (2006.01)
(Continued)

(52) U.S. Cl.
CPC ....... *A47L 11/4005* (2013.01); *A47L 11/4016* (2013.01); *A47L 11/408* (2013.01);
(Continued)

(58) Field of Classification Search
CPC ............ A47L 11/4005; A47L 11/4016; A47L 11/408; A47L 11/4008; A47L 11/302; A47L 9/2836; A47L 9/2884; A47L 11/32; A47L 11/325; A47L 11/33; A47L 11/4011; H01M 10/425; H01M 50/262; H01M 2010/4278; H01M 10/44; H01M 50/247; H01M 50/543
See application file for complete search history.

(56) References Cited

U.S. PATENT DOCUMENTS

2006/0214627 A1* 9/2006 Ito .......................... H01M 10/44 320/107
2011/0012560 A1* 1/2011 Sakakibara ......... H01M 10/441 320/118
(Continued)

FOREIGN PATENT DOCUMENTS

CN 113471610 A * 10/2021 .......... H01M 50/298
EP 3686950 A1 7/2020
(Continued)

OTHER PUBLICATIONS

CN113471610 tranlsation (Year: 2021).*
KR20210062304 (KR102262153) translation (Year: 2021).*

*Primary Examiner* — Michael E Barr
*Assistant Examiner* — Lauren G Orta
(74) *Attorney, Agent, or Firm* — Warner Norcross + Judd LLP

(57) ABSTRACT

A surface cleaning apparatus includes a battery powering one or more electric components. The surface cleaning apparatus can have a cleaning fluid delivery system and/or a cleaning fluid recovery system. The battery, or battery pack, is removable and has a sealing structure configured to resist ingress of cleaning fluid and other liquids.

19 Claims, 8 Drawing Sheets

(51) Int. Cl.

| | |
|---|---|
| ***A47L 11/30*** | (2006.01) |
| ***A47L 11/32*** | (2006.01) |
| ***A47L 11/33*** | (2006.01) |
| ***H01M 10/42*** | (2006.01) |
| ***H01M 10/44*** | (2006.01) |
| ***H01M 50/247*** | (2021.01) |
| ***H01M 50/262*** | (2021.01) |
| ***H01M 50/543*** | (2021.01) |

(52) U.S. Cl.

CPC .......... *A47L 9/2836* (2013.01); *A47L 9/2884* (2013.01); *A47L 11/302* (2013.01); *A47L 11/32* (2013.01); *A47L 11/325* (2013.01); *A47L 11/33* (2013.01); *A47L 11/4008* (2013.01); *A47L 11/4011* (2013.01); *H01M 10/425* (2013.01); *H01M 2010/4278* (2013.01); *H01M 10/44* (2013.01); *H01M 50/247* (2021.01); *H01M 50/262* (2021.01); *H01M 50/543* (2021.01)

(56) References Cited

U.S. PATENT DOCUMENTS

| | | | | |
|---|---|---|---|---|
| 2013/0330576 | A1* | 12/2013 | Kolden | H01M 10/05 429/7 |
| 2017/0222454 | A1* | 8/2017 | Bakker | B25F 5/00 |
| 2020/0060492 | A1* | 2/2020 | Connelly | H01M 50/262 |
| 2020/0253447 | A1* | 8/2020 | Wang | A47L 11/185 |
| 2020/0280033 | A1* | 9/2020 | Radovich | H01M 50/284 |
| 2021/0204768 | A1* | 7/2021 | Scott | A47L 9/322 |

FOREIGN PATENT DOCUMENTS

| | | | | |
|---|---|---|---|---|
| KR | 102262153 | B1 * | 6/2021 | E05B 71/00 |
| WO | 2022031612 | A1 | 2/2022 | |

* cited by examiner

BATTERY-POWERED SURFACE CLEANING APPARATUS

CROSS-REFERENCE TO RELATED APPLICATION(S)

The present application claims the benefit of U.S. Provisional Patent Application No. 63/412,715, filed Oct. 3, 2022, which is incorporated herein by reference in its entirety.

BACKGROUND

Cordless surface cleaning apparatus such as cordless wet/dry cleaners, vacuum cleaners, mops, and other floor cleaners are popular with many users because they are lightweight, easy to maneuver, and require less storage space. However, one drawback of battery-powered floor cleaners is that they often have a short runtime before requiring recharging. Providing a longer runtime is particularly challenging for high-powered floor cleaners, such as those offering greater suction power or liquid dispensing, as these features consume more power, thereby depleting the battery quicker. Floor cleaners that dispense liquid face the further challenge of protecting the battery and its connection from liquid ingress, particularly for those floor cleaners with a removable battery, as the user necessarily must have access the battery for removal.

One prior art solution to prevent liquid ingress for a removable battery is providing the battery and the electrical connection between the battery and other electrical components of the floor cleaner within a sealed compartment with an access door or other closure that a user can open to remove the battery. A drawback of this solution is that the sealed compartment increases the size and the weight of the floor cleaner. Furthermore, the sealed compartment introduces complex design features and can reduce the reliability or service life of the floor cleaner. Providing floor cleaners with a removable battery remains a challenge in the floor cleaning industry.

BRIEF SUMMARY

A battery-powered surface cleaning apparatus is provided with an improved electrical connector.

In one aspect of the disclosure, a surface cleaning apparatus includes a housing, a battery powering at least one electrical component, a first connector part on the battery, a second connector part on the housing coupled with the first connector, and a sealing structure including a first seal at the interface between the first and second connector parts, a second seal at the interface between the first connector part and the battery, and a third seal at the interface between the second connector part and the housing.

In another aspect, the battery is removable from the housing.

In a further aspect, the battery is a battery pack.

In yet another aspect, the first connector is a female connector and the second connector is a male connector.

In still another aspect, the battery comprises a PCB, and the first connector part projects orthogonally from the PCB.

In another aspect of the disclosure, a surface cleaning apparatus includes a housing, a male connector part on the housing electrically coupled with at least one electrical component, and a battery pack powering the at least one electrical component, the battery pack comprising a casing, a least one battery in the casing, a PCB within the casing, and a female connector part on the battery that projects orthogonally from the PCB.

These and other features and advantages of the present disclosure will become apparent from the following description of particular embodiments, when viewed in accordance with the accompanying drawings and appended claims.

DETAILED DESCRIPTION

A battery-powered surface cleaning apparatus having an improved electrical connector is described below. The battery-powered surface cleaning apparatus, also referred to herein as the "surface cleaning apparatus" or the "floor cleaner" has a cleaning system, or multiple cleaning systems, for cleaning a surface, including floor surfaces like carpet, rugs, wood, tile, and the like, or above-floor surfaces like countertops, furniture, and the like. The battery powers at least one electrical component of the cleaning system. As will be appreciated from the description herein, the electrical connector has myriad use applications, but is generally used to electrically couple a battery to electrical components of the floor cleaner. As but one example, the electrical connector can provide connection between a battery pack system and electrical components in order to supply high current electrical power and/or data to the electrical components. At least some aspects of the electrical connector provided herein function through the various elements thereof, as described below, to resist entry of water and other liquids, thereby offering a water—and/or liquid-resistant coupling. At least some aspects of the electrical connector provided herein function through the various elements thereof, as described below, to prevent water/liquid ingress for the battery connector without an additional sealed compartment around the connector. By avoiding an additional sealed compartment, the size and the weight of the floor cleaner is reduced. Furthermore, removal of the battery is more user-friendly since a user can easily engage and disengage the battery from the floor cleaner. As such, certain features of the electrical connector may be considered functional, but may also be implemented in different aesthetic configurations.

Figure 1:
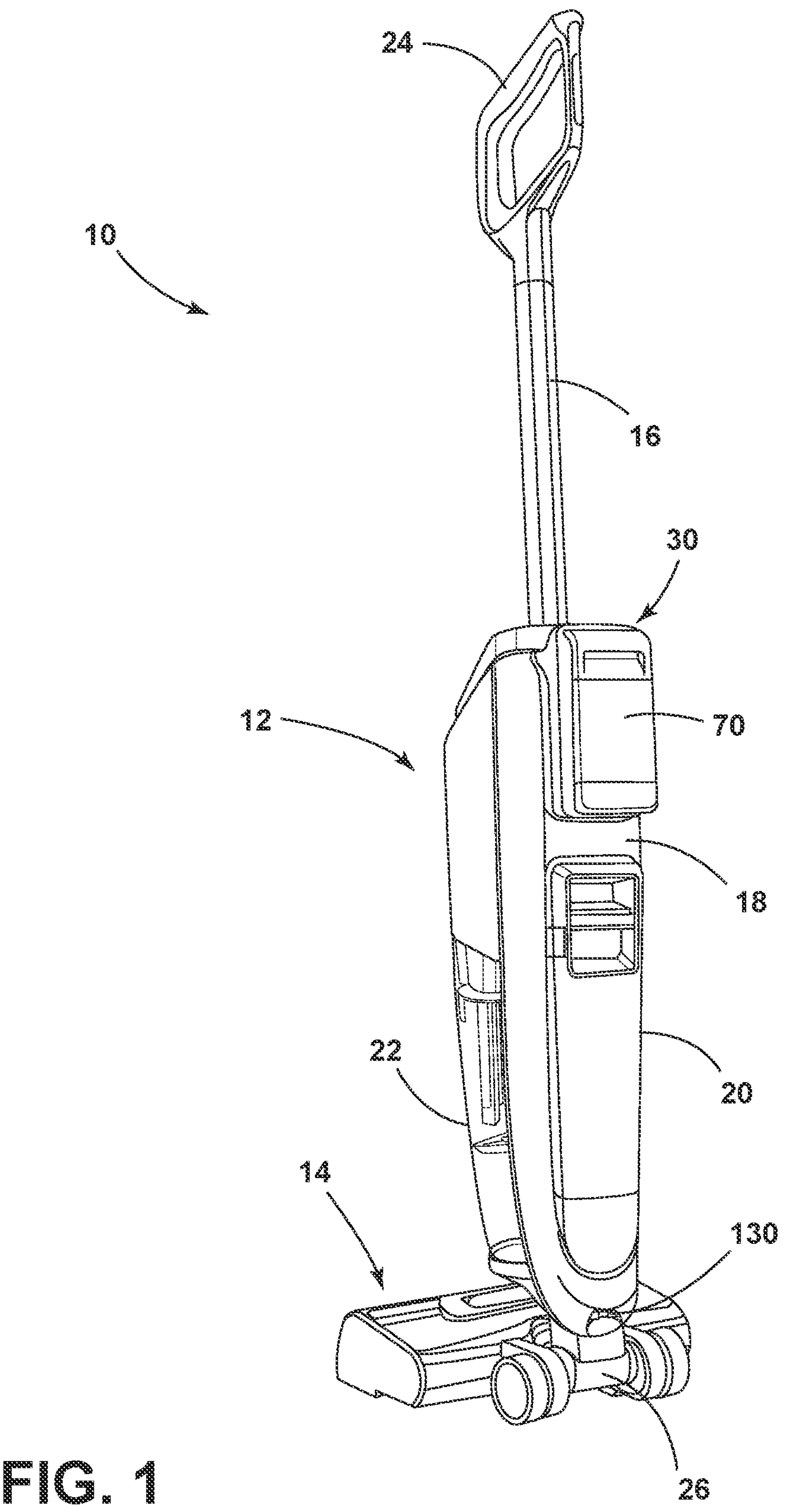
FIG. 1 is a rear perspective view of a surface cleaning apparatus, or floor cleaner, according to one embodiment of the disclosure.
Figure 2:
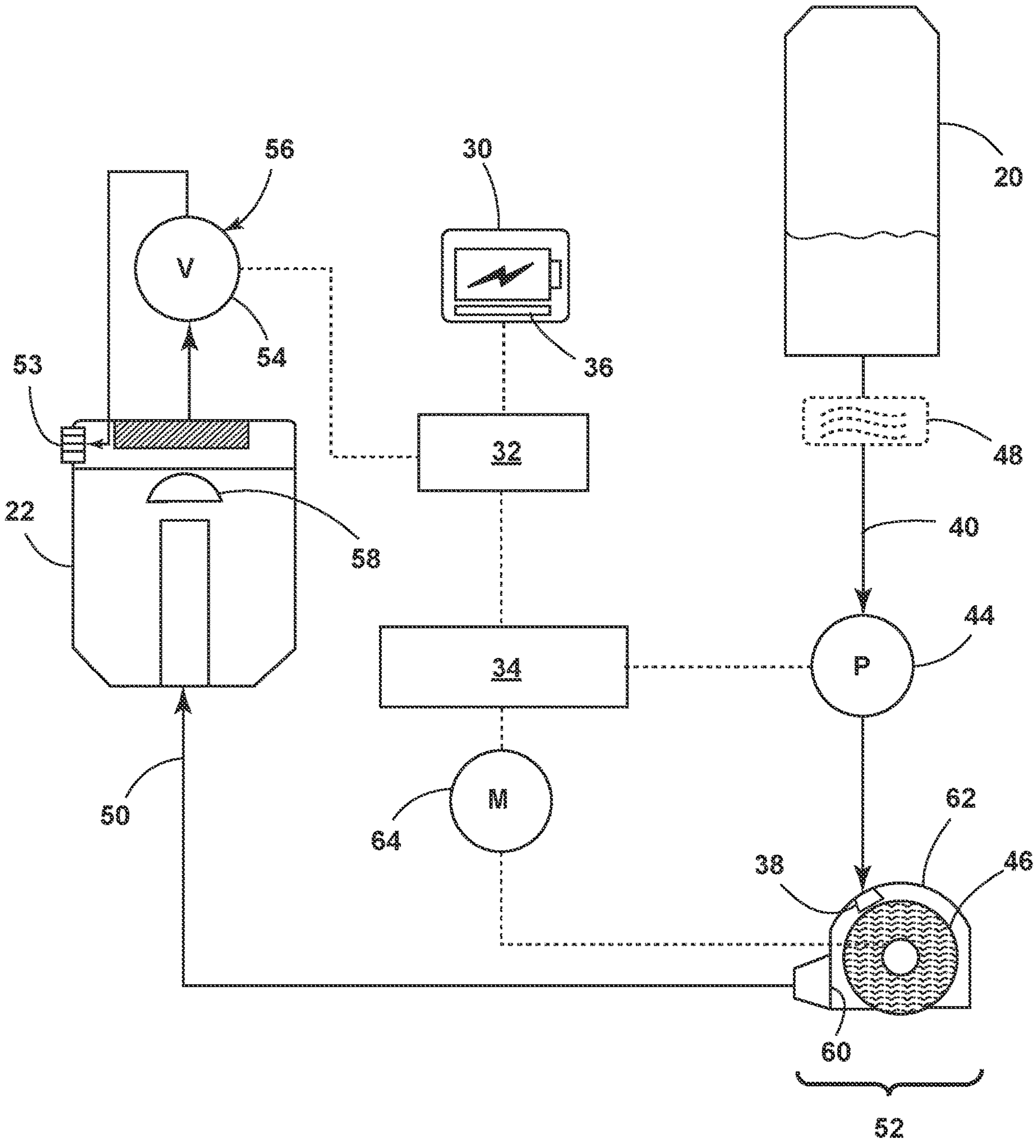
FIG. 2 is a schematic view of various functional systems of the floor cleaner.

In an exemplary embodiment shown in FIGS. 1-2, wherein like numerals indicate corresponding parts throughout the several views, a surface cleaning apparatus is illustrated and generally designated at 10. As discussed in further detail below, the surface cleaning apparatus, also referred to herein as floor cleaner 10, is provided with various features and improvements, including a removable battery 30, an electrical connector for the battery, and a mounting arrangement for the battery.

The floor cleaner 10 can be a wet/dry vacuum cleaner or wet/dry multi-surface cleaner that can be used to clean hard floor surfaces such as tile and hardwood and soft floor surfaces such as area rugs and carpet. The floor cleaner 10 can include multiple cleaning systems, including a fluid delivery system and a recovery system. With both fluid delivery and recovery systems, the apparatus 10 can deliver cleaning fluid to the surface to be cleaned and can recover fluid and debris (which may include dirt, dust, stains, soil, hair, and other debris) from the surface to be cleaned.

The floor cleaner 10 includes an upright handle assembly or body 12 and a cleaning foot or base 14 mounted to or coupled with the upright body 12 and adapted for movement across a surface to be cleaned. The various cleaning systems and components thereof can be supported by either or both the base 14 and the upright body 12. The apparatus 10 can have a moveable joint assembly 26 that connects the base 14 to the upright body 12 for movement of the body 12 about at least one axis, alternative about at least two axes of rotation.

For purposes of description related to the figures, the terms "upper," "lower," "right," "left," "rear," "front," "vertical," "horizontal," "inner," "outer," and derivatives thereof shall relate to the disclosure as oriented in FIG. 1 from the perspective of a user behind the apparatus 10, which defines the rear of the apparatus 10. However, it is to be understood that the disclosure may assume various alternative orientations, except where expressly specified to the contrary.

The upright body 12 can comprise a handle 16 and a frame 18. The frame 18 can comprise a main support section at least partially supporting a supply tank 20 and a recovery tank 22, and may further support additional components of the body 12, including, but not limited to, a battery pack 30. The apparatus 10 can include a fluid delivery or supply pathway, including and at least partially defined by the supply tank 20, for storing cleaning fluid, e.g. cleaning liquid, and delivering the cleaning fluid to the surface to be cleaned and a recovery pathway, including and at least partially defined by the recovery tank 22, for removing liquid and debris from the surface to be cleaned and storing the liquid and debris until emptied by the user.

The handle 16 can include a hand grip 24 at an upper end thereof. The apparatus 10 can include at least one user interface ("UI") through which a user can interact with the apparatus 10 to accomplish one or more functions, and such UI(s) can be disposed on the hand grip 24 and/or on the frame 18.

FIG. 2 is a schematic view of various functional systems of the apparatus 10. The delivery system includes at least one supply tank 20 configured to hold a cleaning fluid, at least one fluid dispenser 38 supplied with cleaning fluid from the supply tank 20, and a fluid supply path 40 from the supply tank 20 to the fluid dispenser 38.

The supply tank 20 can store cleaning fluid in liquid form. The cleaning fluid can comprise one or more of any suitable cleaning fluids, including, but not limited to, water, compositions, concentrated detergent, diluted detergent, other surface cleaning and/or treatment agents, and mixtures thereof. For example, the cleaning fluid can comprise water. In another example, the cleaning fluid can comprise a mixture of water and concentrated detergent.

It is noted that while the apparatus 10 described herein is configured to deliver a cleaning liquid, aspects of the disclosure may be applicable to surface cleaning apparatus that deliver steam. Thus, the term "cleaning fluid" may encompass liquid, steam, or both, unless otherwise noted.

The delivery system can include a flow controller for controlling the flow of fluid from the supply tank 20 to the fluid dispenser 38. In one configuration, the flow controller can comprise a pump 44, which pressurizes the supply path 40 and controls the delivery of cleaning fluid to the fluid dispenser 38. In one example, the pump 44 can be a centrifugal pump. In another example, the pump 44 can be a solenoid pump having a single, dual, or variable speed. The release of cleaning fluid from the dispenser 38 can be controlled manually by the user, e.g. via a trigger (not shown) on the hand grip 24, or automatically by selection of a cleaning mode via a UI (not shown).

The dispenser 38 can comprise various structures, such as a nozzle, a spray tip, or a manifold, and can comprise at least one fluid outlet for dispensing cleaning fluid to the surface to be cleaned. The dispenser 38 can be positioned to deliver cleaning fluid directly to the surface to be cleaned, or indirectly by delivering cleaning fluid onto an agitator, such as, but not limited to, at least one brushroll 46. In one non-limiting example, the dispenser 38 delivers cleaning fluid onto a horizontally-rotatable brushroll 46.

The delivery system can include other conduits, ducts, tubing, hoses, connectors, valves, etc. fluidly coupling the components of the delivery system together and providing the supply path 40.

Optionally, a heater 48 can be provided for heating the cleaning fluid prior to delivering the cleaning fluid to the surface to be cleaned. In one example, an in-line heater 48 can be located downstream of the supply tank 20, and upstream or downstream of the pump 44. Other types of heaters can also be used. In yet another example, the cleaning fluid can be heated using exhaust air from a motor cooling air path for a suction source of the recovery system. In yet another example, the cleaning fluid is unheated.

The recovery system can include a recovery path 50 through the apparatus 10 having a path inlet 52 and a path outlet 53, a suction source 54 including a vacuum motor 56 in fluid communication with the path inlet and configured to generate a working stream through a recovery path 50, and the recovery tank 22 for separating and collecting liquid and debris from a working stream for later disposal. A separator 58 can be formed in a portion of the recovery tank 22 for separating liquid and entrained debris from the working stream.

In one embodiment, the path inlet 52 is disposed on the base 14 and can be defined by a suction inlet port 60 and/or a brush chamber 62 disposed on the cleaning head or base 14. One or both of the suction inlet port 60 and brush chamber 62 can be formed at least in part by a suction nozzle, a brush cover, or a combination thereof.

In one embodiment, the path outlet 53 is disposed on the recovery tank 22, and can be defined by an exhaust vent in the recovery tank 22. In another embodiment, the path outlet 53 is disposed elsewhere on the apparatus 10.

The apparatus 10 can include at least one agitator to agitate the surface to be cleaned. In one embodiment, the agitator is a rotating brushroll 46. In one non-limiting example, the suction inlet port 60 is positioned in close proximity to the brushroll 46 to collect liquid and debris directly from the brushroll 46. Other examples of agitators include, but are not limited to, dual horizontally-rotating brushrolls, one or more vertically-rotating brushes, a stationary brush, or a cleaning pad.

A drive assembly including a brushroll motor 64 can drive the brushroll 46. A drive transmission (not shown) operably connects the motor 64 with the brushroll 46 for transmitting rotational motion of the motor 64 to the brushroll 46. In other embodiment, a drive transmission can operably connect the brushroll 46 with the vacuum motor 56 to transmit rotational motion of the motor 56 to the brushroll 46.

Electrical components of the apparatus 10, including the pump 44, vacuum motor 56, brushroll motor 64, or any combination thereof, are electrically coupled to the battery 30, which can comprise a battery pack, for cordless operation, and is preferably rechargeable. In one example, the rechargeable battery pack 30 is a lithium ion battery.

The apparatus 10 can include a main controller 32 operably coupled with the various systems and components of the apparatus 10. In one embodiment the main controller 32 can comprise a printed circuit board ("PCB"). As used herein, unless otherwise noted, the term "PCB" includes a printed circuit board having a plurality of electrical and electronic components that provide operational control to the apparatus 10. The PCB includes, for example, a processing unit (e.g., a microprocessor, a microcontroller, or another suitable programmable device) and a memory (e.g., a read-only memory ("ROM"), a random access memory ("RAM"), an electrically erasable programmable read-only memory ("EEPROM"), a flash memory, or another suitable magnetic, optical, physical, or electronic memory device). The processing unit is connected to the memory and executes instructions (e.g., software) that is capable of being stored in the RAM (e.g., during execution), the ROM (e.g., on a generally permanent basis), or another non-transitory computer readable medium such as another memory or a disc. Additionally or alternatively, the memory is included in the processing unit (e.g., as part of a microcontroller). Software stored in memory includes, for example, firmware, program data, one or more program modules, and other executable instructions. The processing unit is configured to retrieve from memory and execute, among other things, instructions related to the control processes and methods described herein. The PCB can also include, among other things, a plurality of additional passive and active components such as resistors, capacitors, inductors, integrated circuits, and amplifiers. These components are arranged and connected to provide a plurality of electrical functions to the PCB including, among other things, signal conditioning or voltage regulation. For descriptive purposes, a PCB and the electrical components populated on the PCB are collectively referred to as a controller. Thus, the main PCB and the electrical components populated on the main PCB may be referred to as main controller 32.

Optionally, a base controller 34, alternatively referred to herein as base PCB, can operably couple the main controller 32 with electrical components within the base 14 of the apparatus 10, such as the pump 44 and brush motor 64. In other embodiments, a separate base PCB is not included with the apparatus 10.

The battery pack 30 comprises a battery controller 36, alternatively referred to herein as battery PCB 36, that controls charging and discharging of the battery pack 30 and can communicate with the main controller 32.

Returning to FIG. 1, an architectural layout for the apparatus 10 according to one aspect of the disclosure is shown, including locations and relative positions for the battery pack 30 and other components. Components including the supply tank 20, recovery tank 22, and battery pack 30 are included on the upright body 12. The components of the upright body 12 are arranged with relative positioning that is well-balanced, comfortable for the user to operate, and provides protection for electrical components. For example, the tanks 20, 22 are disposed in a lower end of the frame 18 and the battery pack 30 is disposed in an upper end of the frame 18 to arrange these components in a generally linear, stacked orientation to provide a compact spatial arrangement for the upright body 12 that is comfortable to hold in a reclined use position. The recovery tank 22 is disposed on a lower forward side of the frame 18 and the supply tank 20 is disposed on a rearward side of the frame 18. The battery pack 30 is disposed above the supply tank 20, generally on the rearward side on the frame 18. With the battery pack 30 disposed above the tanks 20, 22, the battery pack 30 is isolated from potential exposure to liquids, such as from leaks from the tanks 20, 22 or other components of the delivery and recovery systems. In the illustrated embodiment, the battery pack 30 is provided within the frame 18 of the upright body 12, on a rear side thereof. The supply tank 20, and one or more conduits coupling the tank 20 to components of the delivery system in the base 14, can be disposed below the battery pack 30. Other arrangements of the components of the apparatus 10 are possible, while maintaining a well-balanced and comfortably operable apparatus 10, and isolated electrical components. As will be described in further detail below, in addition to the position of the battery pack 30 relative to the tanks 20, 22, a liquid-resistant sealing structure can be provided to protect the electrical connection for the battery pack 30.

Figure 3:
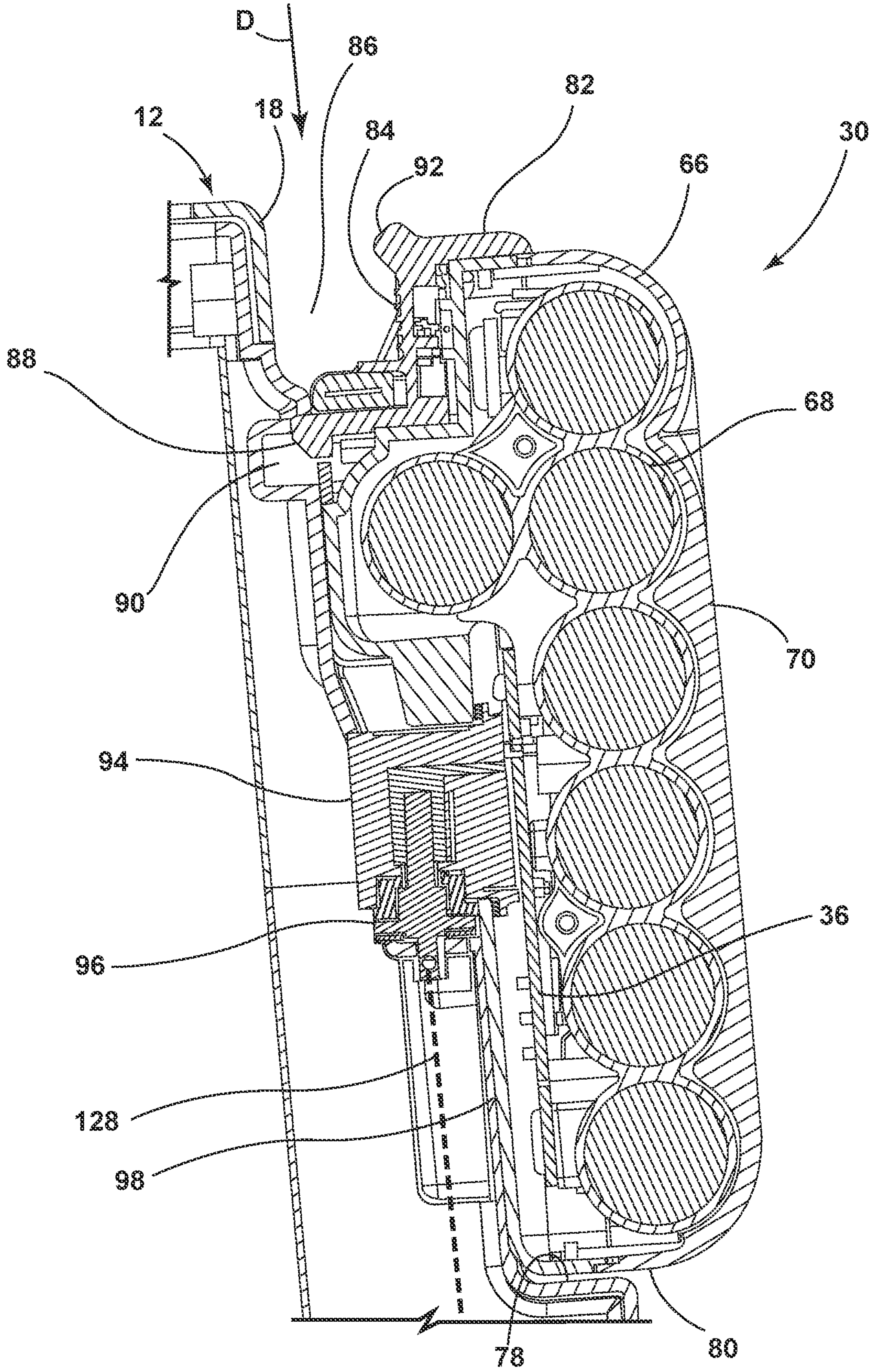
FIG. 3 is a close-up, sectional view showing a battery, or battery pack, coupled to the floor cleaner.

FIG. 3 is a sectional view showing the battery pack 30 on the upright body 12. The battery pack 30 can be removed from the frame 18, and can be mounted to the frame 18 for removal therefrom in any configuration. In the present embodiment, the battery is removable from an upper, rear side of the frame 18.

In one aspect of the disclosure, the battery pack 30 includes a casing 66 and one or more batteries 68 enclosed within the casing 66. The battery PCB 36 is also enclosed with the casing 66.

In one aspect of the disclosure, the battery pack 30 is accessible for removal without opening any doors, covers, or other closures. In other words, the battery pack 30 is on an exterior of the apparatus 10, and may define one or more exterior surfaces of the upright body 12 when installed. An outer side 70 of the battery pack 30 is visible and forms a rear external surface of the apparatus 10 when the battery pack 30 is installed. With this configuration, a user can easily remove or install the battery pack 30 from a typical operating position behind the apparatus 10.

Figure 4:
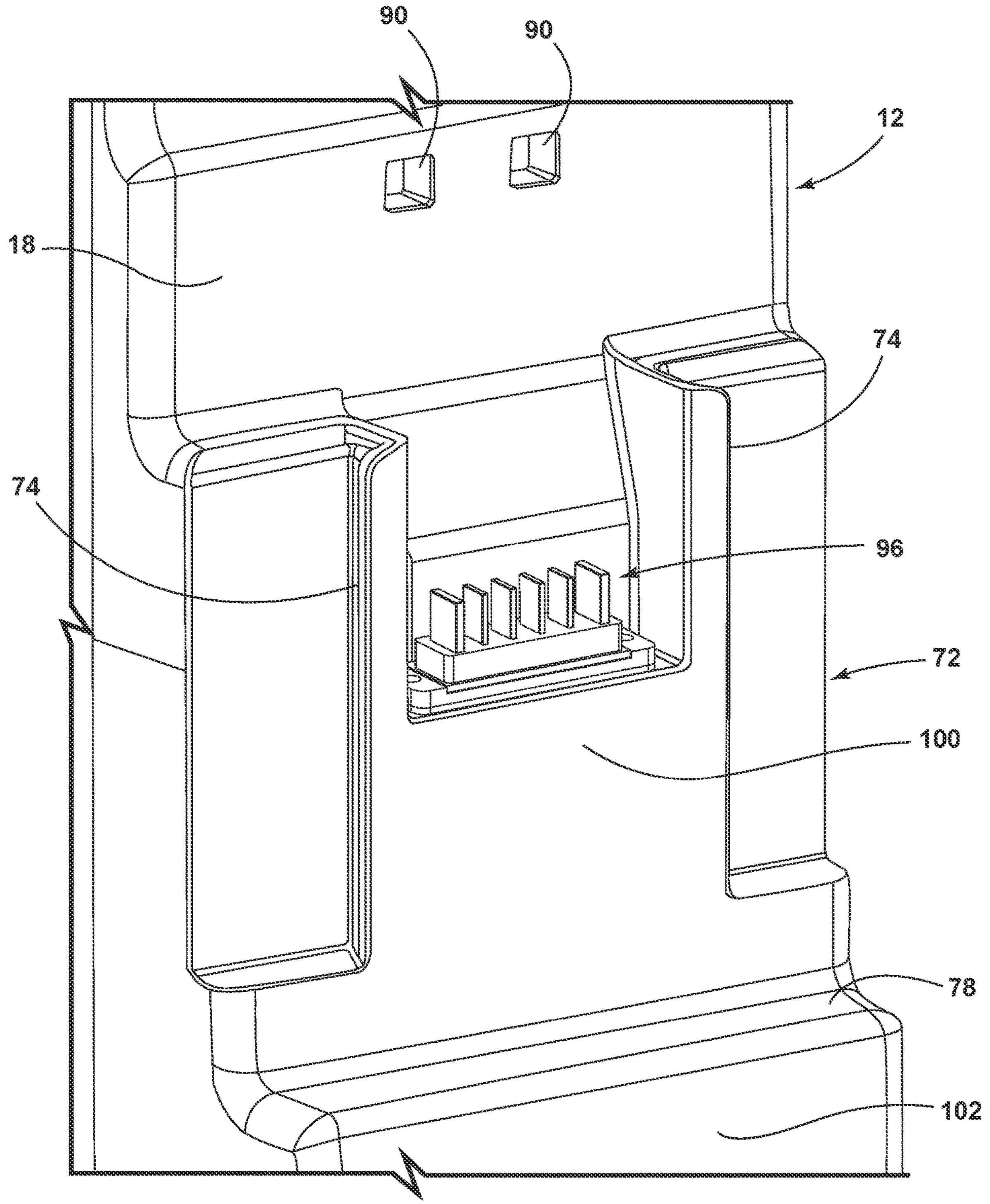
FIG. 4 is a close-up, rear perspective view of the floor cleaner with the battery pack removed to show a battery receiver.

Referring to FIGS. 3-4, the upright body 12 comprises battery socket or receiver 72 for mounting the battery pack 30 thereto. The battery pack 30 can mate with the receiver 72 so that the battery pack 30 can be detachably mounted to the body 12 along an installation direction D. As shown herein, in one embodiment the battery receiver 72 can be defined by portions of the frame 18, and can include spaced rails 74 provided on the frame 18, and more particularly on rear side of the frame 18. The rails 74 can be elongated along the installation direction D. Corresponding tracks (not shown) are provided on the battery pack 30 and can slide along the rails 74. To install the battery pack 30, the tracks are aligned with the rails 74 and the battery pack 30 is slid downwardly in the installation direction D. A stopping feature, such as a ledge 78 provided on the frame 18, and more particularly on the rear side of the frame 18, arrests downward movement of the battery pack 30. In some embodiments, the ledge 78 may partially support the battery pack 30, with a bottom 80 of the battery pack 30 resting on the ledge 78 when installed. Other mounting arrangements for the battery pack 30 are possible.

The battery pack 30 can be mounted to the apparatus 10 by a latch 82. The latch 82 can include a latch button 84 is slidably mounted to the battery casing 66 for enabling removal of the battery pack 30 from the apparatus 10. The button 84 is spaced apart relative to the frame 18 by a recess 86 in which a user can insert at least one finger to actuate the latch 82. The button 84 is pressable to unlatch the battery pack 30 from the apparatus 10 by withdrawing a latching end 88 from a latch receiver 90 on the apparatus 10, on the upright body 12, or more specifically on the rear side of the frame 18. As illustrated, the recess 86 is appropriately sized to receive a user's finger for pressing the button 84. A spring (not shown) can bias the latch 82 to a latched position, an example of which is shown in FIG. 3, in which the latching end 88 projects toward an into the latch receiver 90. Other latching arrangements for the battery pack 30 are possible.

One end 92 of the button 84 can be formed as a raised portion adjacent the recess 86, and, in one exemplary removal action, a user can brace a finger against the raised formation of the end 92 while pressing the button 84 and while bracing a thumb of the same hand against outer side 70 to lift of the battery pack 30 away from the apparatus 10. Thus, the battery pack 30 can single-handedly be unlatched and removed from the apparatus 10.

While only one latching end 88 is visible in FIG. 3, the latch 82 may carry multiple latching ends 88. For example, as can be seen in FIG. 4, the apparatus 10 may have multiple latch receivers 90 for engagement by multiple latching ends 88 of the latch 82.

The battery pack 30 can include a first connector part 94 for electrically connecting the battery pack 30, and specifically the one or more batteries 68 thereof, to suitable electrical components of the apparatus 10. The apparatus 10 can have a second connector part 96 couplable with the first connector part 94 on the battery pack 30. In one embodiment, the battery pack 30 and connector parts 94, 96 are configured to provide high current electrical power and/or data to electrical components of the apparatus 10.

In one arrangement, as illustrated in FIG. 3, the first connector part 94 can be disposed on an inner side 98 of the battery pack casing 66. The inner side 98 may be a side opposite the outer side 70 forming a rear external surface of the apparatus 10 when the battery pack 30 is installed.

Referring to FIG. 4, in one arrangement, the second connector part 96 can be disposed on a rear side 100 of the frame 18. The rear side 100 of the frame 18 may confront the inner side 98 of the battery pack 30 when the battery pack 30 is installed. The second connector part 96 can be recessed within the rear side 100 of the frame 18, and is thereby structurally protected and/or supported. The rear side 100 of the frame 18 on which the connector part 96 is disposed may itself be recessed with respect to at least one other exterior rear surface 102 of the frame 18 to further protect the connector part 96 when the battery pack 30 is not installed. In the embodiment shown herein, the second connector part 96 is disposed between the rails 74, and above the ledge 78.

Referring to FIG. 3, in one aspect of the disclosure, the first connector part 94 on the battery pack 30 is a female connector part and the second connector part 96 on the upright body 12 is a male connector part. The first or female connector part 94 is configured to at least partially receive the second or male connector part 96. In another embodiment, the first connector part 94 can be configured as a male part and the second connector part 96 configured as a female part.

Figure 5:
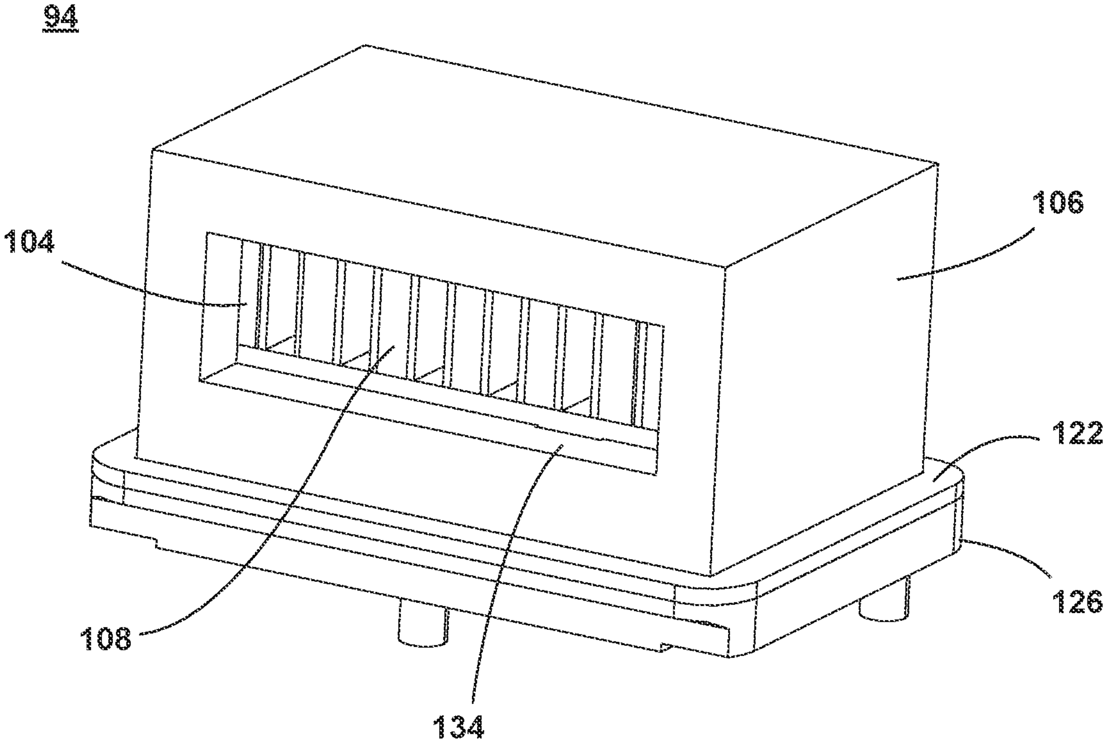
FIG. 5 is a perspective view of a first connector part of the battery pack.

Referring to FIG. 5, in one embodiment, the first connector part 94 can include a plurality of terminal connectors or ports 104, which can be disposed in a supporting structure 106 of the connector part 94 for providing structural protection to the terminal ports 104. The terminal ports 104 can be provided through an interface 108 that is slightly recessed within the supporting structure 106 and are thereby structurally protected and/or supported.

Figure 6:
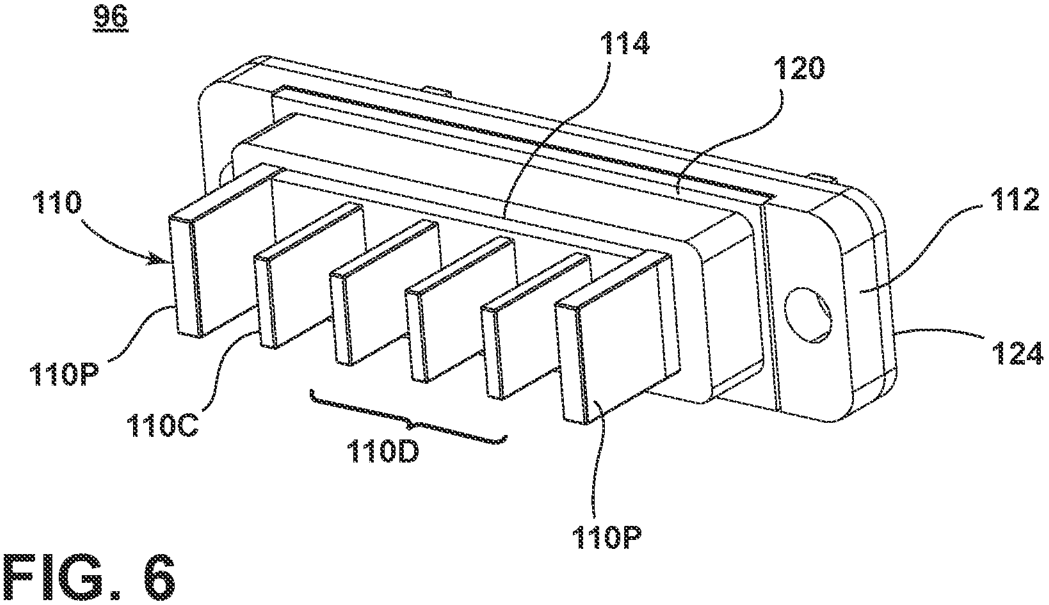
FIG. 6 is a perspective view of a second connector part of the floor cleaner.

Referring to FIG. 6, the second connector part 96 can include a plurality of terminal connectors or pins 110, which can be disposed in a supporting structure 112 of the connector part 96 for providing structural protection to the terminal pins 110. The terminal pins 110 can be provided through an interface 114 that is slightly raised upon the supporting structure 112, and which can thereby be received within the recessed interface 108 of the first connector part 94.

The connector parts 94, 96 can be configured supply high current electrical power and/or data between the battery pack 30 and the electrical components of the apparatus 10. In one embodiment, the terminal set of first connector part 94 can include at least one high current power terminal port (e.g., >45 amp) and at least one high current data terminal port (e.g., >10 amp).

Various terminal sets, including number and type of terminal connectors, are possible. In one embodiment, the second connector part 96 includes two power pins 110P, three data pins 110D, and one charging pin 110C. The first connector part 94 accordingly has six ports 104 configured to receive the aforementioned pins 110.

Returning to FIGS. 7-8, the first connector part 94 can be mounted on the battery PCB 36, and can project generally orthogonally from the battery PCB 36, and also generally perpendicular to the installation direction D, where "generally" includes deviations of up to 5 degrees, alternatively up to 10 degrees. For example, the PCB 36 can generally define a planar surface 116 and the first connector part 94 projects normally from the planar surface 116. In one aspect of the disclosure, the terminal connectors or ports 104 are L-shaped, and have a base portion that projects normally from the planar surface 116 and a slot section that projects optionally from the base portion. The L-shaped terminal ports 104 allow direct surface mount of the first connector part 94 on the PCB 36.

A base 117 can be used to mount the ports 104 within the support structure 106. During assembly, the ports 104 can be inserted into the support structure 106 through a bottom opening thereof, and the base 117 is thereafter inserted, formed, or otherwise attached to secure the ports 104 in place and close the bottom opening of the support structure 106. Optionally, hermetic (i.e., airtight) seals 118 are disposed between the base 117 and the ports 104.

Figure 9:
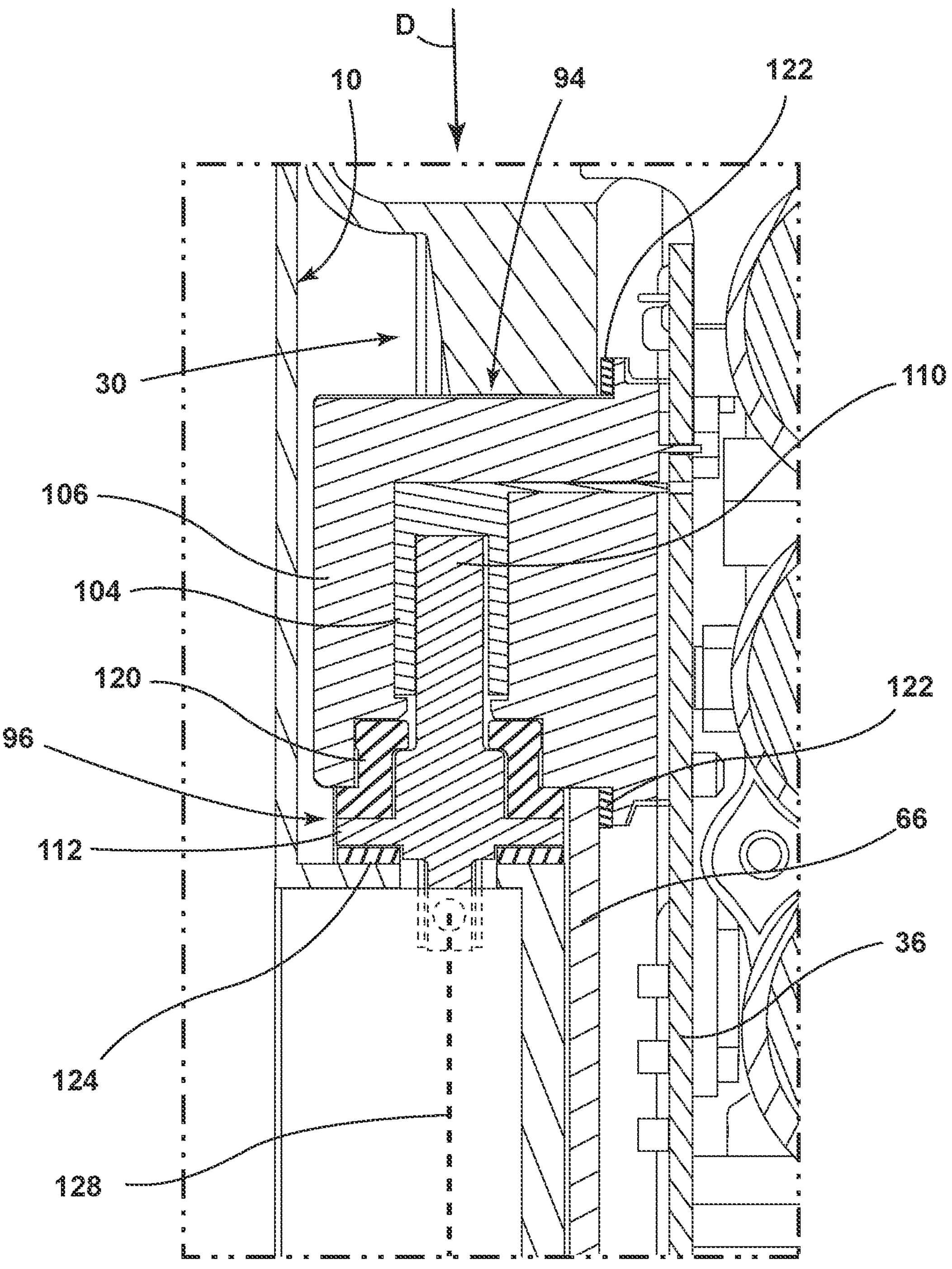
FIG. 9 is a close-up, sectional view showing the connection between the first and second connector parts.

Referring to FIG. 9, in some examples, the connector parts 94, 96 are each oriented along the installation direction D of the battery pack 30 so that when the battery pack 30 is installed on the housing of the apparatus 10, the first connector part 94 connects with the second connector part 96. In one aspect, mating portions of the connector parts 94, 96 are provided in the installation direction D, i.e., the direction in which the battery pack 30 is able to be mounted to the receiver 72. Such mating portions can include, for example, the terminal ports 104 and the terminal pins 110, both of which can be parallel to and elongated along the installation direction D. The first connector part 94 can be oriented downwardly in the installation direction D, e.g., with the terminal ports 104 facing downwardly in the installation direction D, and the second connector part 96 can be oriented upwardly in the installation direction D, e.g., with the terminal pins 110 extending upwardly in the installation direction D. With the connector parts 94, 96 being oriented along the installation direction D, the action of sliding the battery pack 30 downwardly in the installation direction D to mate with the receiver 72 couples the connector parts 94, 96. The battery pack 30 drops down into the battery pack receiver 72 to make the connection.

Referring to FIG. 9, in one aspect of the disclosure, the battery connector has a sealing structure that resists ingress of liquid. The sealing structure can include a first seal 120 at the interface between the first and second connector parts 94, 96, a second seal 122 at the interface between the first connector part 94 and the battery pack 30, and a third seal 124 at the interface between the second connector part 96 and the apparatus 10.

The seals 120, 122, 124 can be disposed on one or more different surfaces and/or in one or more different planes or orientations to protect against the ingress of liquid.

The first seal 120 can be a watertight dynamic seal on the support structure 112 of the second or male connector part 96. The face seal can be disposed on a front or pin-side of the support structure 112. The seal 120 is compressed by contact with the battery pack 30 when mating the male connector part 96 with the female connector part 94.

In embodiment, the male connector part 96 has a T-shaped support structure 112, and the first seal 120 sits on the T-shaped support structure 112. The support structure 106 of the female connector part 94 can have a recessed portion 134, in which the slot interface 108 is disposed, and which receives a portion of the dynamic seal 120 on the raised interface 114 of the male connector part 96.

The second seal 122 can a watertight face seal on the first connector part 94. The face seal 122 is compressed between a flange 126 of the support structure 106 of the first connector part 94, and the casing 66 of the battery pack 30 to resist the ingress of liquid at this interface.

The third seal 124 can be a watertight back face seal on the second connector part 96. The face seal 124 is compressed between a back side of the support structure 112 and the frame 18 of the apparatus 10 to resist the ingress of liquid at this interface.

Figure 7:
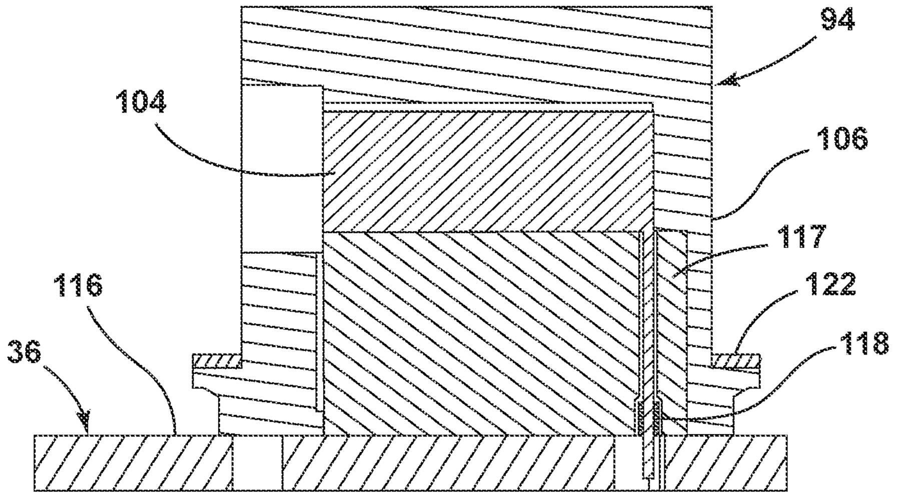
FIG. 7 is a schematic sectional view of the first connector part of FIG. 5.
Figure 8:
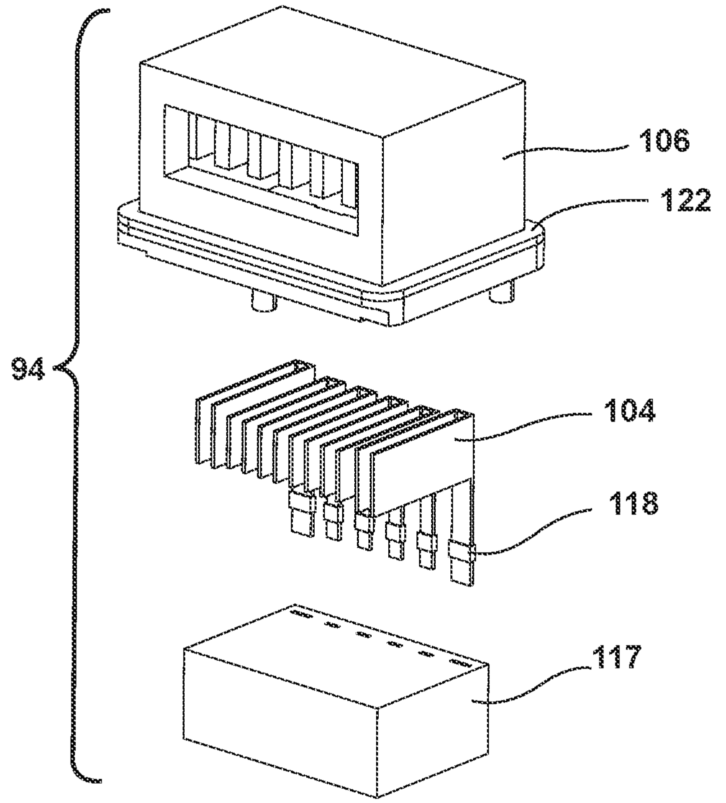
FIG. 8 is an exploded view of the first connector part of FIG. 5.

The second connector part 96 can be connected to a wiring harness 128 inside the apparatus 10, schematically denoted by a dashed line in FIGS. 3 and 7. The wiring harness supplies power and/or data between the battery pack 30, via the second connector part 96, and electrical components of the apparatus 10 that can include, but are not limited to, the main PCB 32, base PCB 34, pump 44, suction source 54, vacuum motor 56, heater 48, and/or brush motor 64 (see FIG. 2). It is noted that, in some embodiments, wiring supplying power and/or data between the second connector part 96 and electrical components in the base 14, which can include, but are not limited to, the base PCB 34, pump 44, and/or brush motor 64, can extend though the joint assembly 26 (FIG. 1).

Figure 10:
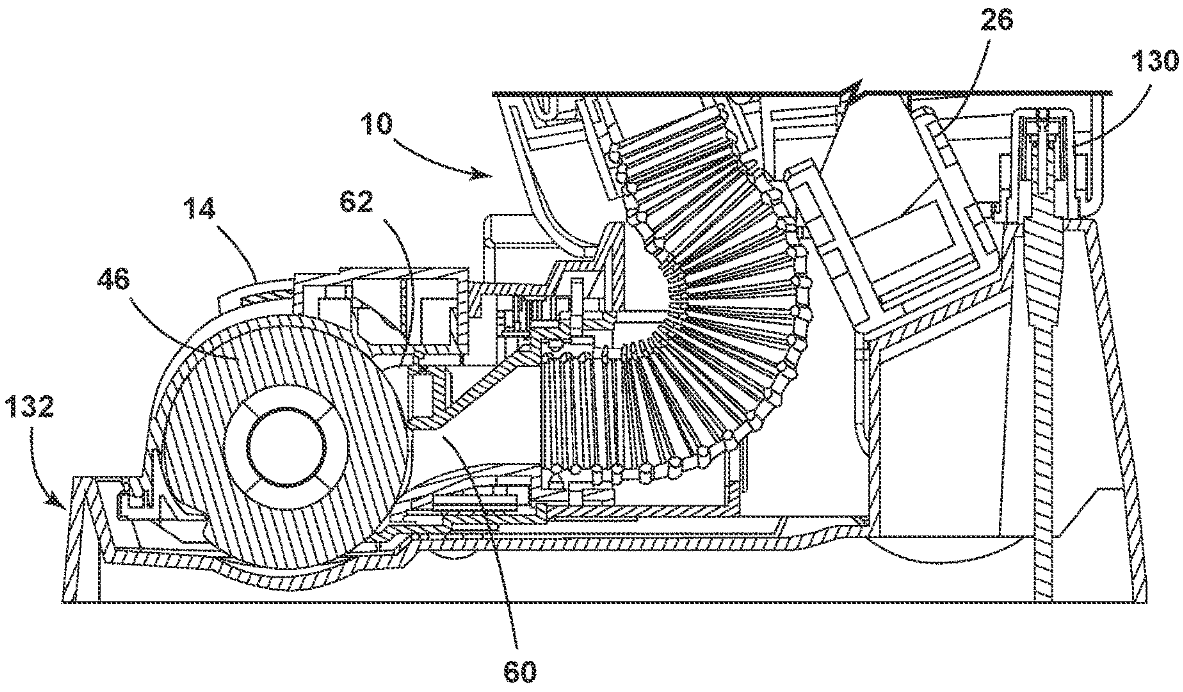
FIG. 10 is a sectional view showing the floor cleaner docked on a tray for recharging.

The battery pack 30 can by recharged in place on the apparatus 10, or can be removed from the apparatus 10 for recharging. Referring to FIG. 10, for regarding in place on the apparatus 10, a charging port 130 can be provided on the upright body 12 and can be electrically coupled with the battery pack 30 (FIG. 1). In the illustrated embodiment, the charging port 130 is provided on a rear side of the apparatus 10. A tray 132 can dock the apparatus 10 and recharge the battery pack 30. The tray 132 can be configured to receive the base 14 of the floor cleaner 10 in an upright, stored position. The tray 132 can further be configured for further functionality, such as to store the apparatus 10 when not in use and/or to self-clean the apparatus 10.

Alternatively or additionally to the tray 132, a battery charger (not shown) can be provided for recharging the battery pack 30 when removed from the apparatus 10. The battery charger can have a connector part substantially similar to the second or male connector part 96 described herein, and can mate with the first or female connector part 94 on the battery pack 30 for recharging. The battery/charger electrical connection may therefore have one or more aspects of the battery/apparatus electrical connection described herein. In one aspect of the disclosure, the battery charger can have a sealing structure that resists ingress of liquid, including having a seals substantially similar to the first seal 120 and the third seal 124 at its connector part.

The provision of a battery charger allows a depleted battery pack to be swapped out for a charged battery pack, thereby extending the effective runtime of the apparatus 10. Accordingly, in some applications, multiple interchangeable battery packs 30 are provided for the apparatus 10. In still other applications, one battery pack 30 can be swapped between different surface cleaning apparatus.

It is noted that throughout the figures, the floor cleaner 10 is illustrated as an upright device. However, it is understood that the functional systems of the floor cleaner 10 can be arranged into any desired configuration, such as an upright device having a base and an upright body for directing the base across the surface to be cleaned, a portable device adapted to be hand carried by a user, a canister device having a cleaning implement connected to a wheeled base by a vacuum hose, an autonomous or robotic device having an autonomous drive system and an autonomously moveable housing, or a commercial device. Any of the aforementioned cleaners can be adapted to include a flexible vacuum hose, which can form a portion of a conduit between a nozzle and a suction source.

While various aspects illustrated herein are shown on a multi-surface wet/dry vacuum cleaner, aspects of the present disclosure may be used on other types of surface cleaning apparatus, including, but not limited to, “dry” vacuum cleaners that does not deliver or extract liquid, but rather is used for collecting relatively dry debris, extraction cleaners that deliver a greater amount of liquid for deep cleaning a soft floor surface, and steam cleaners that generates steam by heating liquid to boiling for delivery to the surface to be cleaned. As used herein, the terms “wet/dry vacuum cleaner” or “wet/dry multi-surface cleaner” includes a vacuum cleaner that can be used to clean hard floor surfaces such as tile and hardwood and soft floor surfaces such as carpet.

The terms “comprising” or “comprise” are used herein in their broadest sense to mean and encompass the notions of “including,” “include,” “consist(ing) essentially of,” and “consist(ing) of. The use of “for example,” “e.g.,” “such as,” and “including” to list illustrative examples does not limit to only the listed examples. Thus, “for example” or “such as” means “for example, but not limited to” or “such as, but not limited to” and encompasses other similar or equivalent examples.

The above description relates to general and specific embodiments of the disclosure. However, various alterations and changes can be made without departing from the spirit and broader aspects of the disclosure as defined in the appended claims, which are to be interpreted in accordance with the principles of patent law including the doctrine of equivalents. As such, this disclosure is presented for illustrative purposes and should not be interpreted as an exhaustive description of all embodiments of the disclosure or to limit the scope of the claims to the specific elements illustrated or described in connection with these embodiments. Any reference to elements in the singular, for example, using the articles "a," "an," "the," or "said," is not to be construed as limiting the element to the singular.

Likewise, it is also to be understood that the appended claims are not limited to express and particular compounds, compositions, or methods described in the detailed description, which may vary between particular embodiments that fall within the scope of the appended claims. With respect to any Markush groups relied upon herein for describing particular features or aspects of various embodiments, different, special, and/or unexpected results may be obtained from each member of the respective Markush group independent from all other Markush members. Each member of a Markush group may be relied upon individually and or in combination and provides adequate support for specific embodiments within the scope of the appended claims.

What is claimed is:

1. A surface cleaning apparatus, comprising:

a cleaning system comprising at least one electric component, wherein the cleaning system is configured to at least one of deliver cleaning fluid to a surface to be cleaned and recover fluid and debris from the surface to be cleaned;

a housing comprising a battery pack receiver;

a removable battery pack powering the at least one electric component and detachably mounted to the battery pack receiver along an installation direction, the battery pack comprising a casing, at least one battery in the casing, and a first electrical connector part comprising:

a plurality of terminal ports; and a supporting structure providing structural protection to the plurality of terminal ports and comprising a slot interface and a recessed portion in which the slot interface is disposed, wherein the plurality of terminal ports are provided through the slot interface;

a second electrical connector part on the housing electrically coupled with the at least one electrical component to supply electrical power and/or data to the at least one electrical component, the second electrical connector part comprising:

a plurality of terminal pins insertable into the terminal ports; and a T-shaped support structure providing structural protection to the plurality of terminal pins and comprising a raised interface receivable by the slot interface of the first electrical connector part, wherein the plurality of terminal pins are provided through the raised interface of the T-shaped support structure;

a first seal at an interface between the first and second electrical connector parts;

a second seal at an interface between the first electrical connector part and the battery pack; and a third seal at an interface between the second electrical connector part and the housing;

wherein the second electrical connector part faces upwardly in the installation direction and the first electrical connector part faces downwardly in the installation direction;

wherein the T-shaped support structure of the second electrical connector part comprises the first seal on the raised interface, and the recessed portion of the first electrical connector part receives a portion of the first seal on the raised interface.

2. The surface cleaning apparatus of claim 1, comprising a main controller configured to control the cleaning system, wherein the battery pack comprises a battery controller configured to control charging and discharging of the battery pack and communicate with the main controller.

3. The surface cleaning apparatus of claim 2, wherein the battery controller is enclosed with the casing.

4. The surface cleaning apparatus of claim 1, wherein the casing defines an exterior surface of the housing when installed, with an outer side of the battery pack being visible and forms an external surface of the surface cleaning apparatus when the battery pack is installed on the housing.

5. The surface cleaning apparatus of claim 1, wherein the battery pack receiver comprises a pair of spaced rails elongated along the installation direction, wherein the battery pack slides along the rails to install the battery pack and connect the first electrical connector part with the second electrical connector part.

6. The surface cleaning apparatus of claim 1, wherein the surface cleaning apparatus is a wet/dry vacuum cleaner and the cleaning system includes a fluid delivery system and a recovery system, and wherein the at least one electrical component comprises at least one of a pump, a heater, a vacuum motor, and an agitator motor.

7. The surface cleaning apparatus of claim 1, wherein the housing comprises:

an upright body comprising a tank of the cleaning system; and a base coupled with the upright body and adapted for movement across a surface to be cleaned;

wherein the battery pack is disposed on an upper rear side of the upright body, above the tank of the cleaning system.

8. The surface cleaning apparatus of claim 1, wherein the second seal is on the supporting structure of the first electrical connector part and is compressed by the casing of the battery pack.

9. The surface cleaning apparatus of claim 1, wherein the third seal is on the T-shaped support structure of the second electrical connector part and is compressed by a portion of the housing.

10. The surface cleaning apparatus of claim 1, wherein the battery pack comprises a printed circuit board within the casing, and the first electrical connector part projects orthogonally from the printed circuit board and generally perpendicular to the installation direction.

11. The surface cleaning apparatus of claim 10, wherein the plurality of terminal ports are L-shaped and comprise a base portion projecting from the printed circuit board and a slot section extending from the base portion.

12. The surface cleaning apparatus of claim 1, wherein the first electrical connector part is a female connector and the second electrical connector part is a male connector.

13. The surface cleaning apparatus of claim 1, wherein the supporting structure comprises a flange and the second seal is compressed between the flange and the casing of the battery pack.

14. The surface cleaning apparatus of claim 1, wherein the plurality of terminal ports and the plurality of terminal pins extend parallel to the installation direction.

15. The surface cleaning apparatus of claim 1, wherein the first electrical connector part further comprises a base securing the plurality of terminal ports within the supporting structure, wherein hermetic seals are disposed between the base and the plurality of terminal ports.

16. The surface cleaning apparatus of claim 1, wherein the first, second, and third seals are disposed on different sealing planes.

17. A surface cleaning apparatus, comprising:

a cleaning system comprising at least one electric component, wherein the cleaning system is configured to at least one of deliver cleaning fluid to a surface to be cleaned and recover fluid and debris from the surface to be cleaned;

a housing comprising a battery pack receiver;

a male connector part on the housing electrically coupled with at least one electrical component within the housing, wherein the male connector part comprises:

a plurality of terminal pins; and a T-shaped support structure providing structural protection to the plurality of terminal pins and comprising a raised interface, wherein the plurality of terminal pins are provided through the raised interface of the T-shaped support structure;

a removable battery pack powering the at least one electric component, wherein the battery pack is detachably mounted to the battery pack receiver along an installation direction, the battery pack comprising a casing, a least one battery in the casing, a printed circuit board within the casing, and a female connector part on the at least one battery that projects orthogonally from the printed circuit board, wherein the female connector part comprises:

a plurality of terminal ports configured to receive the plurality of terminal pins; and a supporting structure providing structural protection to the plurality of terminal ports and comprising:

a slot interface configured to receive the raised interface of the male connector part; and a recessed portion in which the slot interface is disposed, wherein the plurality of terminal ports are provided through the slot interface; and a seal at an interface between the male and female connector parts, wherein the seal is compressed by contact with the battery pack;

wherein the male connector part faces upwardly in the installation direction and the female connector part faces downwardly in the installation direction;

wherein the T-shaped support structure of the male connector part comprises the seal on the raised interface, and the recessed portion of the female connector part receives a portion of the seal on the raised interface.

18. The surface cleaning apparatus of claim 17, wherein the battery pack receiver comprises a pair of spaced rails elongated along the installation direction, wherein the battery pack slides along the rails to install the battery pack and connect the female connector part with the male connector part.

19. The surface cleaning apparatus of claim 17, wherein the supporting structure of the female connector part projects orthogonally from the printed circuit board and the plurality of terminal ports extend in the installation direction.

* * * * *